Nov. 2, 1937.  W. W. SIBSON, JR  2,098,066
TREATING APPARATUS
Filed Aug. 19, 1935  4 Sheets-Sheet 3
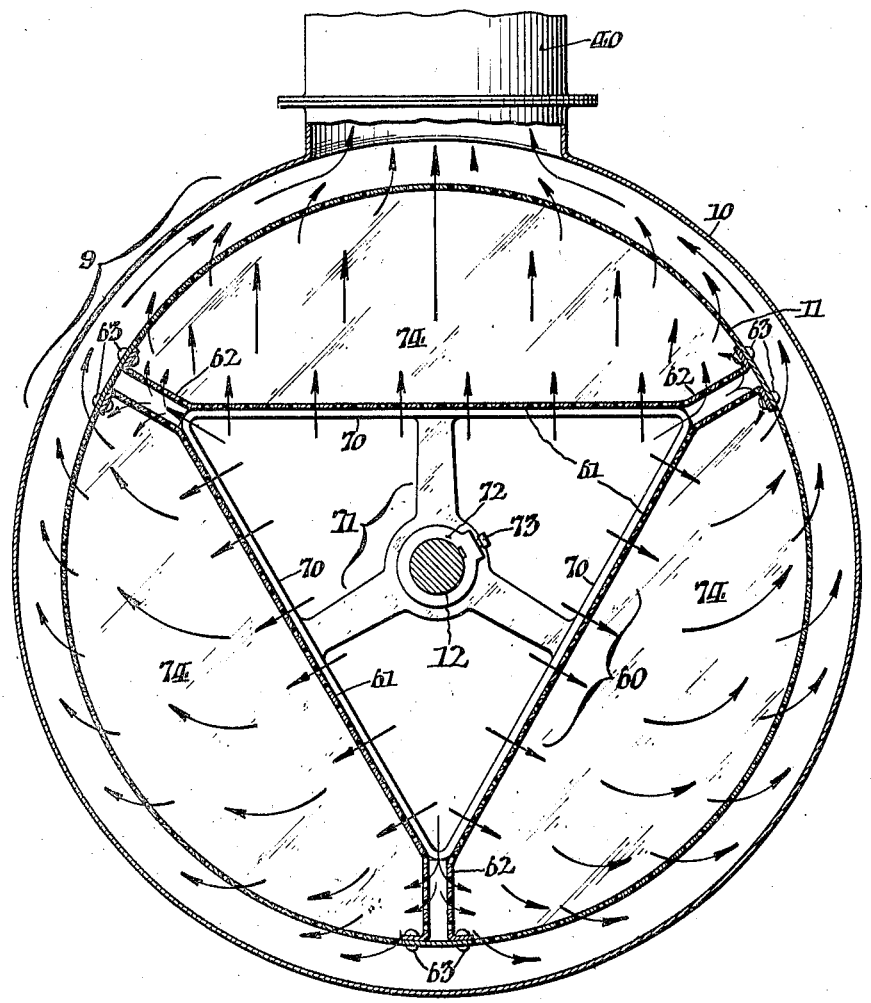
FIG. III.

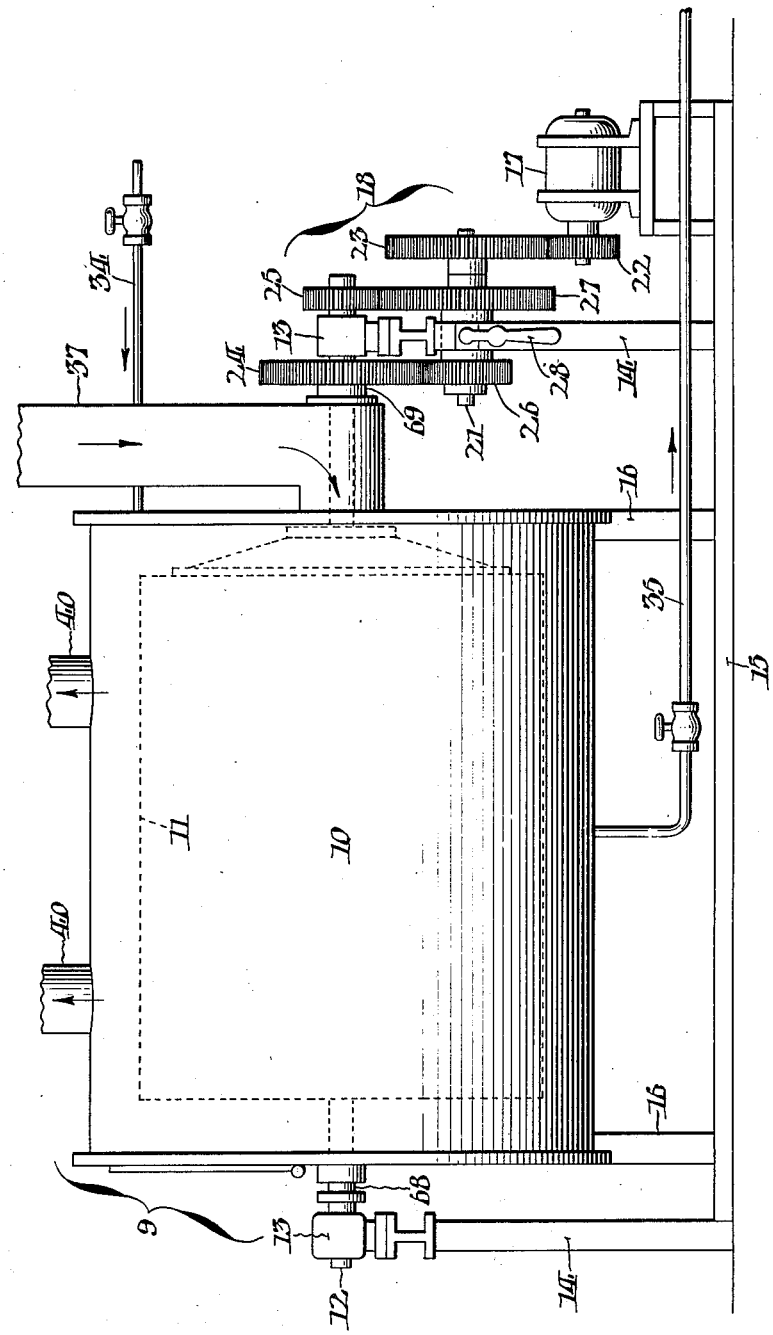

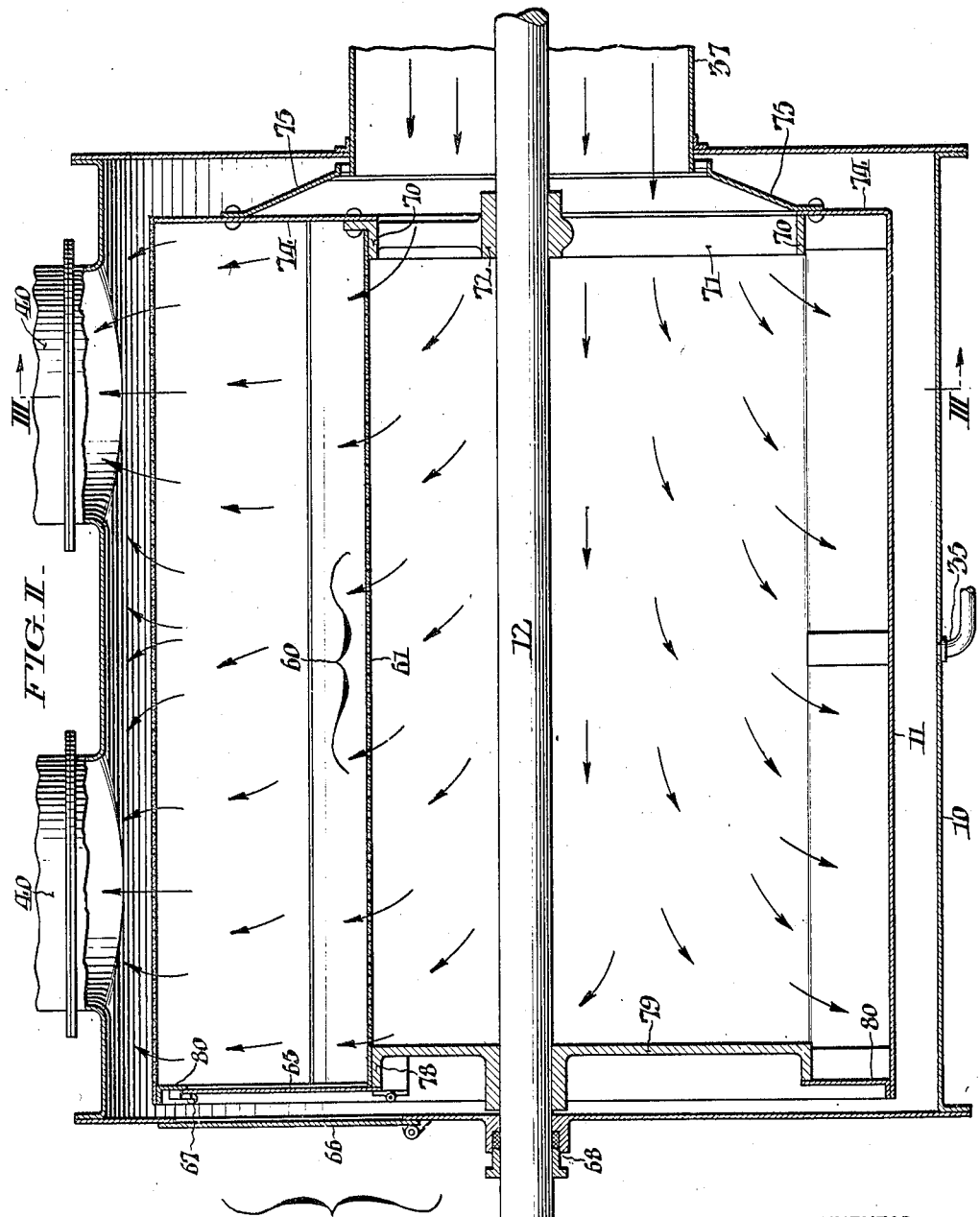

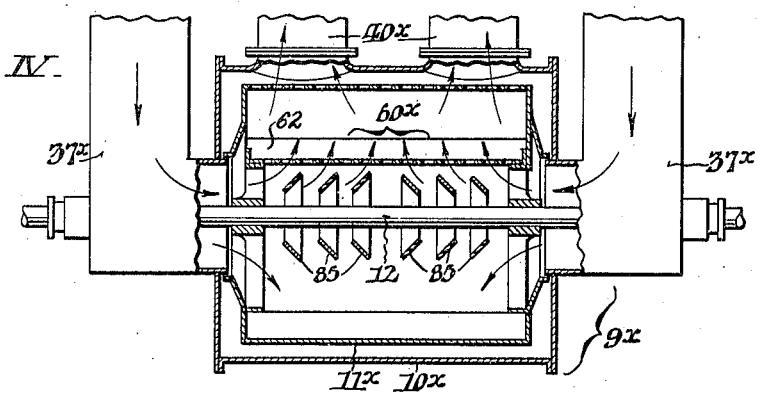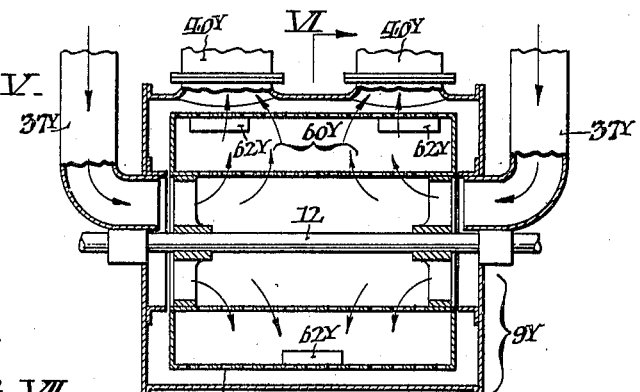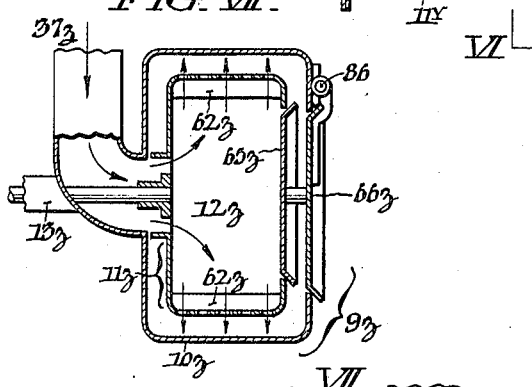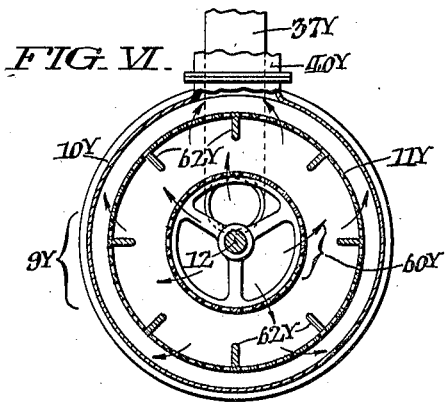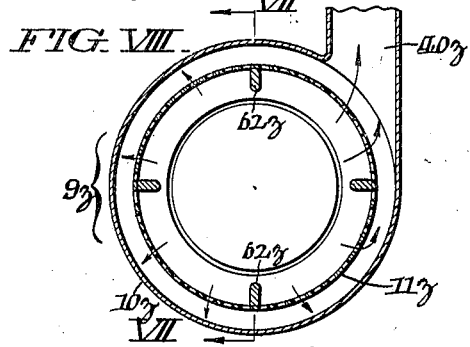

Patented Nov. 2, 1937

2,098,066

UNITED STATES PATENT OFFICE 2,098,066

TREATING APPARATUS

Walter W. Sibson, Jr., Philadelphia, Pa., assignor to The Philadelphia Drying Machinery Company, Philadelphia, Pa., a corporation of Pennsylvania Application August 19, 1935, Serial No. 36,818

4 Claims. (Cl. 68—18)

The present application is a continuation in part of application #28,438 filed by me on June 26, 1935.

My invention relates to apparatus for treating or processing goods such as textile materials and fabrics, clothing, and other objects with liquids and/or gases. In suitable forms of embodiment such as herein shown and described, the invention enables a variety of operations incident to such treating or processing to be carried out conveniently, expeditiously, and economically. Other features and advantages of the invention will appear from the following description of species thereof, and from the drawings. So far as novel over the art, indeed, all the features here shown or described are of my invention.

In the drawings, Fig. I is a side elevation of a treating apparatus embodying my invention.

Fig. II shows a longitudinal vertical section through the treating apparatus.

Fig. III shows a section through the treating apparatus at right angles to Fig. II, taken as indicated by the line and arrows III—III in Fig. II.

Fig. IV is a view similar to Fig. II, but more diagrammatic and on a smaller scale, illustrating a variant of the treating apparatus.

Figs. V and VI are diagrammatic longitudinal and transverse sectional views similar to Figs. II and III, illustrating another variation of the treating apparatus.

Figs. VII and VIII are diagrammatic longitudinal and transverse sectional views illustrating yet another variation of the treating apparatus.

The treating apparatus 9 here shown (see especially Fig. I) has a closed casing 10 that serves to confine liquid or gas (such as solvent or air) with which the materials or objects are treated or processed. Within the casing 10 is a revoluble foraminous drum 11 to contain the materials while being treated. Drum 11 has axis or trunnion means 12 mounted to turn in bearings 13, which are carried by the end uprights 14, 14 of the machine frame and base structure 15. The frame 15 may also include uprights 16 for supporting the casing 10. The drum 11 may be driven by an electric motor 17 mounted on the frame 15, through suitable gearing here diagrammatically represented at 18. The driving means 17, 18 may include provisions for rotating the drum 11 at relatively slow speed to treat the materials with liquid, and at a higher speed to centrifuge the materials, or while otherwise drying them. Preferably the drum 11 revolves in opposite directions alternately when at slow speed, like that of a laundry washer: one way of doing this is to reverse the motor 17 at short intervals. The gearing 18 is here represented as including a countershaft 21 driven from the motor shaft through reduction gears 22, 23. Fast on the drum axis or shaft 12 are gears 24, 25 that mesh with gears 26, 27 on the countershaft 21, to which they may be alternatively connected by suitable means controlled by throwing a handle 28 one way or the other from its mid-position shown in Fig. I. When the gear 26 is connected to countershaft 21, the drum 11 is driven at relatively low speed; when the gear 27 is connected to said shaft 21, the drum is driven at much higher speed; and when neither gear is connected to said shaft 21, the drum 11 remains at rest, as for discharging work and recharging with other work.

Treating liquid may be conducted to the apparatus 9 through a valved pipe 34, and withdrawn through another valved pipe 35. If desired or advantageous for certain treatments, the liquid may be circulated by connecting the pipes 34 and 35 to a suitable pump (not shown).

For passing air or other treating gas through the apparatus, there is a supply conduit 37 delivering into one end of the casing 10 around the axis 12, and exhaust conduits 40 shown as opening laterally from the top of the said casing. The air or gas may be circulated by a blower (not shown) in circuit with the conduits 37 and 40, or it may be exhausted from the casing 10 through said conduits 40.

As shown in Figs. II and III, the casing 10 and drum 11 are cylindrical in form, and of sheet metal construction,—though of course neither of these features is essential. The peripheral wall of the drum 11 is shown as foraminous, consisting of sheet metal (such as aluminum) pierced with a multitude of small holes; while its end walls (except as hereinafter otherwise mentioned) are solid. Through the midst of the drum 11 extends a foraminous longitudinal air or gas trunk or conduit 60, here shown as of polygonal (triangular) cross section, bounded by multi-apertured sheet metal sides or septa 61. In the present instance, the corners of the polygonal trunk 60 are attached or connected to the wall of the drum 11 by outward extensions 62 of the foraminous trunk sides 61, which are flanged and riveted to the drum wall at 63. Thus the goods space in the drum 11 around the trunk 60 is divided into a plurality of pockets for the materials or articles. Where the work pockets directly adjoin one another, they are separated by the double-walled or hollow septa 62, whose outer ends are attached to the outer wall 11 as already described. These pockets may be loaded or emptied in any convenient manner, as through hinged doors 65 at one end of the drum 11, adapted to be brought into coincidence (as shown in Fig. II) with a corresponding hinged door 66 at the end of the casing 10. As shown, the doors 65, 66 are hinged at their inner sides or edges adjacent the axis 12, so that centrifugal force tends to hold the doors 65 shut when the apparatus is in operation. In addition, any suitable securing means 67 may be provided for positively securing the doors 65. Suitable provision may be made for sealing fluid-tight the openings in the end of the casing 10 and in the wall of the conduit 37 through which the shaft 12 extends, as by means of stuffing boxes indicated at 68, 69 in Figs. I and II.

In the apparatus here shown, the air or gas is supplied to the central air trunk 60 from one end, through the conduit 37 extending and opening into the interior of the casing 10 through its end wall opposite the doors 65, 66. Accordingly, the corresponding end structure of the drum 11 includes an open polygonal angle frame 70, including a spider 71 with hub 72 mounted and secured on the shaft 12 in any suitable way, as by a set screw 73. The ends of the walls 61 of the trunk 60 are secured (as by riveting) to flanges of the side members of the frame 70. The end of the material space around the trunk 60 is closed by an (unperforated) sheet metal wall 74, secured (riveted) to other flanges of the frame 70. As shown in Fig. II, there may be a frusto-conical hood 75 secured (riveted) to the drum wall 74 at its outer edge, and closely surrounding the end of the conduit 37 at its inner edge,—to prevent dispersion of air or gas from the conduit into the casing 10 around the drum 11. The other end of the drum 11 embodies a structure 78 similar to the frame 70, but having its center closed and connected to its hub by a solid web 79,—instead of the spider 71. The corresponding end of the space around the trunk 60 is closed by the doors 65 and by a sheet metal outer frame or inward-extending flange 80 against which they close, and which covers the space between the outturned extensions 62 of the trunk sides 61.

In the use of the apparatus, the materials, or articles to be treated are loaded into the space of the drum 11 around the trunk 60 through the doors 65, 66, which are then closed. Treating liquid is then admitted to the casing 10 through the valved pipe line 34, preferably so as to fill the casing about half full or even more, and the valve 34 is closed. The drum 11 with its charge of the materials is slowly revolved in the liquid in the casing 10 until the materials are thoroughly saturated. For this purpose, the drum 11 may at this stage either revolve continuously in one direction, or may oscillate or revolve in opposite directions alternately, as already mentioned. Then the valves in the pipe line 35 are opened for drainage of the treating liquid from the apparatus. For certain treatments the drum 11 is revolved at relatively high speed to centrifuge the materials and free them of the treating liquid. For other treatments, a lower speed will be used, so as to expel from the materials only the excess of liquid, leaving in them a definite amount of liquid as may be required.

The treatment with liquid and the centrifuging having been completed, heated or chilled air may be circulated through the apparatus 9. The air thus passed through the apparatus 9 evaporates. Or it "takes up" the moisture remaining in the materials and carries it through the exhaust ducts 40 or cools the material. In certain treatments, in lieu of air, other gas or gases may be used in the apparatus.

When treating or processing of the materials has been completed, the doors 65, 66 may be opened and the treated materials removed and replaced with other materials to be treated.

While the materials are being treated with liquid in the apparatus 9, the foraminous drum 11 with its foraminous-walled pockets formed by the septa 61 acts to move the materials through the liquid very much like a laundry washer. The foraminous walls of drum 11 and of partitions and septa 61, 62 allow a free flow of the liquid in and out of the pockets and also circumferentially between the inner and outer drums, from pocket to pocket, passing through the material in every direction. During the subsequent centrifuging, the centrifugal force expels the superfluous liquid substantially radially through the appertures of the peripheral wall of the drum 11, so that it collects and runs down in the casing 10 to be drained away through the pipe 35.

When air or other gas is being passed through the apparatus 9 via the conduits 37 and 40, to dry, cool or otherwise affect the materials, it flows lengthwise through the trunk or conduit 60 and passes outward across the surrounding material space in the drum 11, through the outer drum wall, and into the annular space in the casing 10 around the drum 11, where it flows upward to the discharge conduits 40. The course of the air or gas from the trunk 60 to the conduits 40 is approximately indicated by the arrows in Fig. III. From these it will be seen that while the air or gas from the top of the conduit 60 tends to pass almost straight upward to the outlets in the top of the casing 10, the course of the air or gas from the lower portion or sides of the conduit 60 is somewhat different: viz., it passes first outward and downward, and then tends to bend upwards as it approaches the periphery of the drum 11. As the upward draft toward the outlets is substantially unaffected by the revolution of the drum 11, this flow of the air or gas remains approximately the same as the drum revolves. Hence the air or gas passes through the materials in a different direction in each of the material pockets around the air trunk 60. It will also be observed from Fig. III that with the outward extensions 62 of the trunk sides 61 foraminous or perforated as shown, the air or gas flows outward from the corners of the polygonal trunk 60 through the hollow foraminous-walled septa formed by the partition extensions 62, and diverges into the outer corners of the material pockets, which thus receive an ample supply of air or gas. In a word, the air or gas is not only distributed very evenly to the materials all around the air trunk 60, in all positions of the drum 11, but is caused to pass through the materials in all sorts of different directions as they travel around the trunk 60 with the revolution of the drum. Thus very uniform and rapid processing of the materials is secured.

Fig. IV illustrates a variation of the air or gas flow as represented in Figs. II and III, consisting principally in the provision of double conduit connections 37x, 37x to the apparatus 9x, at each end of its casing 10. These connections 37x, 37x may be used either concurrently, or alternatively; or if desired, they may be periodically interchanged in use during each treating cycle of operation of the apparatus. As shown in Fig. IV, there are annular conical deflectors 85 around both ends of the shaft 12, to assist in throwing the air or gas outward into each end of the space for the material being treated. These are especially useful when only one of the supply connections 37x, 37x is used, to prevent the air or gas from blowing through one end of the conduit 60x before it begins to spread outward and pass through the conduit walls into the material space.

Fig. V shows another variation in the construction and arrangement of the apparatus. Here the central longitudinal air trunk 60y is circular, and the conduit connections 37y, 37y extend through the ends of the casing 10 eccentric to its axis 12, instead of around the latter as in Figs. I–IV. Instead of having septa 62 extend all the way across the material space between the air trunk 60y and the peripheral wall of the shell 11, longitudinal ridges or vanes 62y extend inward from the peripheral shell wall at suitable intervals around the trunk 60y, only part of the radial distance across the material space. These ridges 62y serve as lifting lugs to carry up and drop the materials during the washing and drying cycles, and also divide the space into distinct material pockets. This arrangement assures revolution of the materials with the shell 11, while at the same time allowing somewhat freer circulation of the air or gas through them, and even some movement and shifting of the revolving materials under the influence of gravity.

Figs. VII and VIII show a somewhat simpler apparatus, approximately only half as long as those of Figs. I–VI. Here the central air or gas trunk is omitted altogether. The shell 11z receives air or gas from the conduit 37z very much as in Figs. I, II, IV, through the midst of its left-hand end wall, and the air or gas passes upward and outward through the foraminous peripheral wall of the shell 11z. As shown in Fig. VIII, the latter has inward extending ridges or vanes 62z which define the material pockets, as shown in Fig. V. From the casing 10z, the air or gas may be discharged tangentially through a lateral outlet 40z adjacent its end opposite the conduit 37z, here shown as extending vertically upward. The materials may be introduced and withdrawn from the rotary shell 11z through a central circular door 66z in the opposite end wall of the casing and a corresponding circular door 65z in the adjacent end wall of the shell 11z. As shown, the inner door 65z is attached to the outer door 66z so that it can be swung outward with the latter on its hinge 86. The peripheral edges of both doors are bevelled, and those of the inner door 65z lie in close proximity to the edge of the corresponding circular opening in the revolving shell 11z. In this instance, the revolving shell 11z is "overhung", its shaft axis 12z being mounted in an extended bearing 13z outside the casing 10z and air conduit 37z.

It will be understood, of course, that in practice the air or gas flow through the apparatus 9 might be reversed as compared with Fig. I: i. e., air might be admitted to the apparatus at 40, 40 or at 40x, 40x or at 40y, 40y, or at 40z, and discharged from the apparatus at 37, 37x, 37y, 37z.

Having thus described my invention, I claim:

1. Treating apparatus comprising a casing adapted to contain treating liquid; a rotary drum in said casing having a foraminous peripheral wall pervious to the liquid; foraminous partitions forming hollow foraminous-walled septa in said drum, with intervening work pockets between said septa, and with direct passage for the liquid through said septa from pocket to pocket; and means for passing air or gas through said casing and said work pockets of said drum, via said hollow foraminous-walled septa and the peripheral wall openings of the drum, said means including conduit means for air communicating with the interiors of said hollow septa.

2. Treating apparatus comprising a casing adapted to contain treating liquid; a rotary drum in said casing having a foraminous peripheral wall pervious to the liquid; foraminous partitions defining a plurality of work pockets in the drum and forming hollow foraminous-walled septa separating said pockets, with direct passage for the liquid through said septa from pocket to pocket, and conduit means interconnecting the inner ends of said septa in the midst of the drum; and means for passing air or gas through said casing and said work pockets, via said conduit means and foraminous-walled septa and the peripheral wall openings of the drum.

3. Treating apparatus comprising a casing adapted to contain treating liquid; a rotary outer drum in said casing having a foraminous peripheral wall pervious to the liquid; a foraminous inner air or gas drum or trunk in said outer drum; hollow foraminous-walled septa internally communicating with the trunk and connecting it to the outer drum walls, and forming a plurality of work pockets in the interspace between said trunk and said outer drum, with direct passage for the liquid through said septa from pocket to pocket; and means for passing air or gas through said casing and said work-pockets of said drum, via said trunk and said foraminous-walled septa, and the peripheral wall openings of the outer drum.

4. Treating apparatus comprising a casing adapted to contain treating liquid; a rotary outer drum in said casing having a foraminous peripheral wall pervious to the liquid; a foraminous inner air or gas drum or trunk mounted in said outer drum, with interspace between said outer drum and said trunk for materials to be treated, and with passage for liquid circumferentially around said trunk in said interspace; deflecting means in said trunk presenting diagonal surface to longitudinal or radial air or gas flow therein, for deflecting such flow; and means for passing air or gas through said casing and said interspace of said drum, longitudinally of the trunk and radially across the interspace, through the foraminous drum and trunk walls.

WALTER W. SIBSON, Jr.